US005729619A

United States Patent [19]
Puma

[11] Patent Number: 5,729,619
[45] Date of Patent: Mar. 17, 1998

[54] OPERATOR IDENTITY, INTOXICATION AND DROWSINESS MONITORING SYSTEM AND METHOD

[75] Inventor: Samuel C. Puma, Torrance, Calif.

[73] Assignee: Northrop Grumman Corporation, Los Angeles, Calif.

[21] Appl. No.: 512,593

[22] Filed: Aug. 8, 1995

[51] Int. Cl.⁶ .................................................. G06K 9/00
[52] U.S. Cl. ............................................ 382/115; 382/181
[58] Field of Search ............................. 382/115, 116, 382/117, 118, 119, 120, 124, 126, 127, 321, 181, 190, 192, 209, 217, 224, 278, 312, 317, 318, 319, 323; 128/665, 733, 719; 180/272, 268; 340/576, 575, 573; 364/569; 351/205, 206, 210; 436/132

[56] References Cited

U.S. PATENT DOCUMENTS

| | | | |
|---|---|---|---|
| 3,811,116 | 5/1974 | Takeuchi et al. | 340/172.5 |
| 4,142,601 | 3/1979 | Ochiai | 180/99 |
| 4,592,443 | 6/1986 | Simon | 180/272 |
| 4,613,845 | 9/1986 | Du Bois | 340/52 R |
| 4,641,349 | 2/1987 | Flom et al. | 382/2 |
| 4,725,824 | 2/1988 | Yoshioka | 340/575 |
| 4,728,939 | 3/1988 | Otani | 340/576 |
| 4,953,111 | 8/1990 | Yamamoto et al. | 364/569 |
| 4,978,303 | 12/1990 | Lampbell | 434/258 |
| 4,996,151 | 2/1991 | Conners et al. | 436/132 |
| 4,997,770 | 3/1991 | Giles et al. | 436/132 |
| 5,291,560 | 3/1994 | Daugman | 382/2 |

FOREIGN PATENT DOCUMENTS

| | | | |
|---|---|---|---|
| 55-149986 | 5/1982 | Japan | B60K 28/00 |
| 64-134177 | 1/1991 | Japan | B60K 28/06 |

OTHER PUBLICATIONS

Downes et al. "Differential Corneal Sensitivity to Ultraviolet Light Among Inbred Strains of Mice", Cornea 13(1), 1994, pp. 67–72. (Publisher: Raven Press, Ltd., New York.).

*Primary Examiner*—Leo Boudreau
*Assistant Examiner*—Bijan Tadayon
*Attorney, Agent, or Firm*—Terry J. Anderson; Karl J. Hoch, Jr.

[57] ABSTRACT

An integrated vehicle operator monitoring system for a vehicle including a device for monitoring operator identity to ensure a vehicle operator is authorized to operate the vehicle, a device for monitoring operator intoxication, and a device for monitoring operator drowsiness. There is also a device for preventing the operator from operating the vehicle when the operator identity monitoring device indicates the operator is not authorized to operate the vehicle and/or the operator intoxication monitoring device indicates the operator is intoxicated. In addition, an alarm capable of being activated when the operator drowsiness monitoring device indicates the vehicle operator is drowsy, is included.

50 Claims, 4 Drawing Sheets

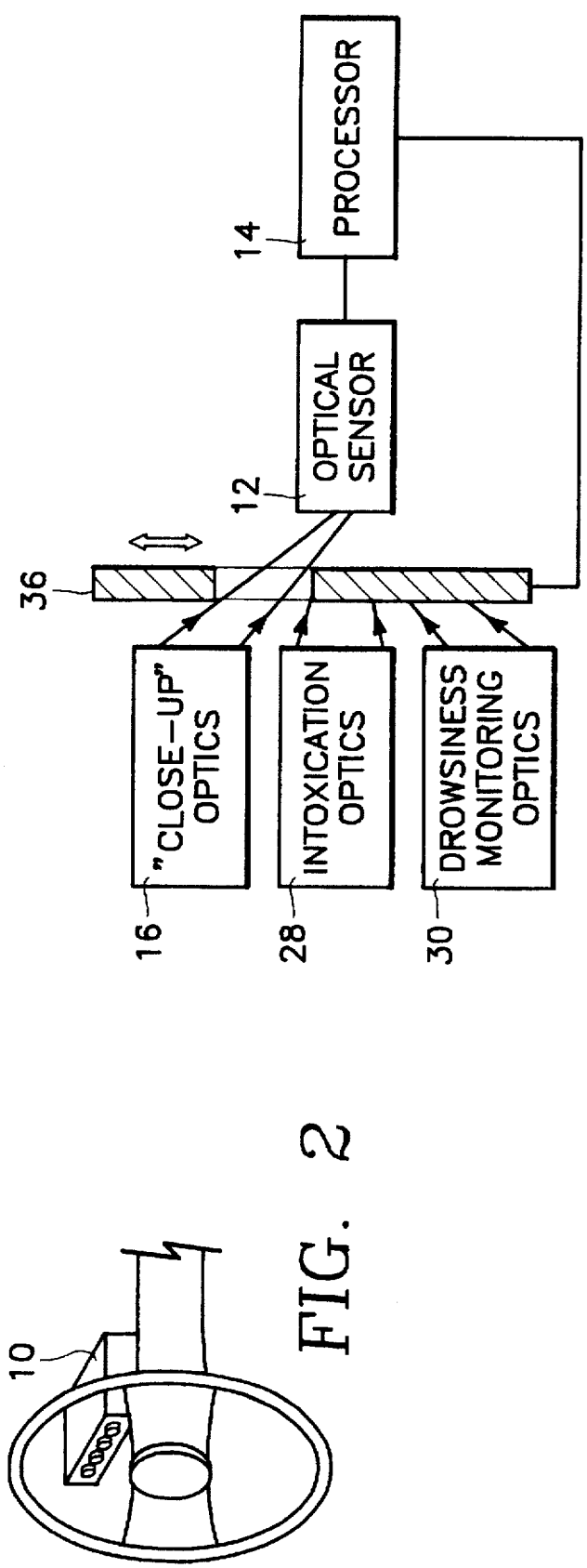
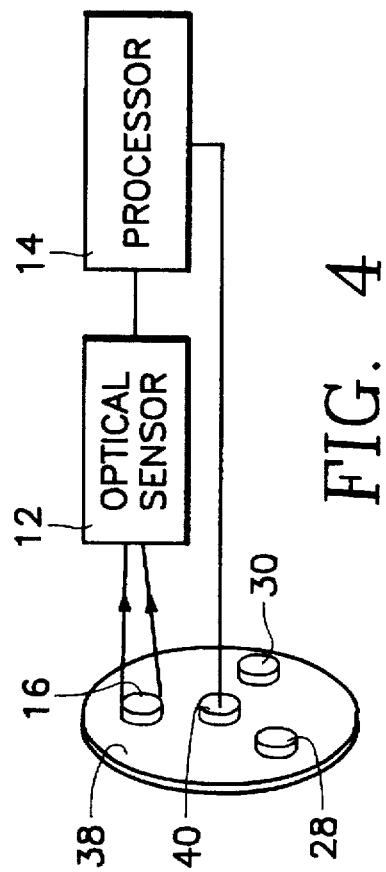

OPERATOR IDENTITY, INTOXICATION AND DROWSINESS MONITORING SYSTEM AND METHOD

BACKGROUND OF THE INVENTION

1. Technical Field

The present invention relates to devices and methods for checking the identity of a person, for determining if a person is intoxicated and for determining if a person is drowsy, and more particularly to a non-intrusive integrated system which combines all three of these devices and methods to prevent the operation of a vehicle if the person is not authorized to do so or is intoxicated, and to warn the person if he or she is about to fall asleep while operating the vehicle.

2. Background Art

Thousands of deaths and injuries, as well as extensive property damage, result every year from vehicular accidents caused by intoxicated drivers and drivers who fall asleep at the wheel. In addition, vehicular theft has become a serious problem resulting in considerable property loss, both by individual owners and the insurance industry. These problems are not limited to ground transportation vehicles, either. They apply equally as well to air and sea-borne vehicles.

Commercial transportation vehicles are particularly susceptible to the problems of operator fatigue and intoxication, and to theft. A high workload demand is placed on the operators of commercial vehicles. As such, commercial vehicle operators work long hours. The resulting fatigue is the cause of numerous accidents. An intoxicated operator of a commercial vehicle can expose a large number of persons to danger, such as when the vehicle in question is a passenger bus, train or airplane. And finally, potentially valuable cargo carried by commercial shipping vehicles makes them attractive targets to thieves.

While previous attempts have been made to provide devices and methods for personnel identification, intoxication detection, and drowsiness monitoring, respectively, no one has developed an integrated system which includes all three of these functions. Therefore, what is needed is a non-intrusive system capable of preventing an unauthorized or intoxicated operator from operating the vehicle, and capable of warning a vehicle operator that he or she is falling asleep at the wheel.

SUMMARY

Wherefore, it is an object of the present invention to provide a vehicle operator identity monitoring system which uses the unique pattern of a person's iris for determining whether an operator is authorized to operate the vehicle.

Wherefore, it is another object of the present invention to provide a vehicle operator intoxication monitoring system for determining if an operator is too intoxicated to operate the vehicle by detecting intoxicants and/or the physiological by-products of these intoxicants, or other secondary biochemical changes caused by the intoxicants in the tear film covering the surface of the operator's eyes, or in the various structures of the eye.

Wherefore, it is yet another object of the present invention to provide a vehicle operator drowsiness monitoring system for determining if an operator is about to fall asleep by detecting certain physical and performance characteristics indicative of imminent sleep.

Wherefore, it is still another object of the present invention to provide an integrated vehicle operator monitoring system which incorporates at least two of the aforementioned vehicle operator identity, intoxication and drowsiness monitoring systems.

The foregoing objects have been attained by an integrated vehicle operator monitoring system for a vehicle including a housing having at least two of a device for monitoring operator identity to ensure a vehicle operator is authorized to operate the vehicle, a device for monitoring operator intoxication, and a device for monitoring operator alertness. There is also a device for preventing the operator from operating the vehicle when the operator identity monitoring device indicates the vehicle operator is not authorized to operate the vehicle and/or the operator intoxication monitoring device indicates the vehicle operator is intoxicated. Additionally, an alarm which is activated when the operator drowsiness monitoring device indicates the vehicle operator is drowsy, is also included.

The operator identity monitoring device includes an optical sensor and operator identity monitoring optics. The optics are capable of focusing an image of the operator's eye on a sensing surface of the sensor. The device also includes a memory. This memory is used to store data associated with certain predetermined characteristics of the irises of vehicle operators' eyes who are authorized to operate the vehicle. And, the device is capable of determining if the vehicle operator is authorized to drive the vehicle from a signal output by the optical sensor representing an image of the vehicle operator's eye and the stored data. This is preferably accomplished with the use of a processor capable of deriving data corresponding to the aforementioned predetermined characteristics of the vehicle operator's iris from the sensor signal and comparing it with the stored data associated with the irises of authorized vehicle operators. The processor also indicates either that the vehicle operator is authorized to operate the vehicle whenever a substantial match is found between the derived data and the stored data, or the vehicle operator is not authorized to operate the vehicle when no substantial match is found between the derived data and the stored data.

The operator identity monitoring device can also have an illuminator unit capable of illuminating the eye of the vehicle operator to highlight and contrast the predetermined characteristics of the vehicle operator's iris. Preferably, this illuminator unit produces at least one wavelength of light in a range from about near infrared to near ultraviolet. Finally, it is preferred that the monitoring device included a capability for indicating to the vehicle operator a position in reference to the housing where the operator is required to place his or her eye such that the operator identity monitoring optics provides a best possible focused image at the sensing surface to the optical sensor. This indicating can be done by projecting a two-pad image where the two pads of the image come to a focus only at the aforementioned best focus position. Thus, the vehicle operator would move his or her head until both pads of the projected image come into focus, then attempt to start the vehicle.

Further, in one version of the operator identity monitoring device, the operator would be required to place both eyes, one after another, at the aforementioned best focus position. In this case, the processor would indicate the operator was authorized whenever the characteristics of at least one of the operator's irises substantially matches the stored data. Otherwise, the operator would be deem unauthorized and the vehicle would be disabled.

The operator intoxication monitoring device specifically includes an optical sensor and operator intoxication monitoring optics. The optics are used to collect light reflected or emitted from an eye of the vehicle operator, spectrally separate the collected light to form an absorbance and fluorescence emission pattern, and focus the spectrally separated light on the sensing surface of the optical sensor. There is also a memory for storing data sets respectively associated with an absorbance and fluorescence emission pattern formed from spectrally separated light reflected or emitted from an eye of an intoxicated person. Each of these stored data sets represents either a particular intoxicant and an associated concentration of that intoxicant in the body of the vehicle operator, or a particular combination of intoxicants and associated concentrations. Additionally, a processor is included to determine from a signal output by the optical sensor and the stored data sets if the vehicle operator is too intoxicated to drive the vehicle. Preferably, this processor derives data associated with an absorbance and fluorescence emission pattern associated with spectrally separated light reflected or emitted from the eye of the vehicle operator from the signal output by the optical sensor, then compares the derived data with the stored data sets and indicates that the vehicle operator is too intoxicated to operate the vehicle if a substantial match is found between the derived data and any stored data set. It is also preferred that a operator intoxication monitoring device include an illuminator unit for illuminating the eye of the vehicle operator with eye-safe levels of light having a spectral range from about near infrared to near ultraviolet to enhance the reflections from the eye.

It is noted that the same optical sensor, memory, processor, and illuminator unit could be shared between the operator identity and operator intoxication monitoring devices. Likewise, since light reflected or emitted from an eye of the operator must be collected and focused on the sensor, it would be convenient to employ the previously described operator positioning device to place the operators eye in the optimum location to obtain the best possible focus at the sensor. Accordingly, it is also preferred to perform the operator identity and intoxication checks at the same time while the operator's eye is in the aforementioned position.

The operator drowsiness monitoring device functions by monitoring certain physical and performance characteristics of an operator which are indicative of drowsiness. Each individual characteristic monitored is prioritized and a voting logic is employed to decide if the vehicle operator is about to fall asleep. If such a condition is detected, a warning is provided to the operator. Preferably, this warning is some type of sensible alarm which will rouse the operator. Specifically, the operator drowsiness monitoring device includes an optical sensor and operator drowsiness monitoring optics capable of focusing an image of the vehicle operator's head and eyes on a sensing surface of the sensor. There is also a memory for storing image data associated with physical characteristics of a vehicle operator's head and eyes which are indicative of drowsiness, or alternately, indicative of alertness. A processor isolates from a signal output by the optical sensor that portion corresponding to the aforementioned physical characteristics, and indicates from the isolated portion of the signal and the stored image data, which of the physical characteristics exhibited by the vehicle operator are indicative of drowsiness. This indicating is accomplished by deriving image data corresponding to various physical characteristics of the vehicle operator's head and eyes from the sensor signal and comparing it with the stored image data. In addition, the operator drowsiness monitoring device can have an element for monitoring performance characteristics (as opposed to physical characteristics) associated with the vehicle operator's actions to control of the vehicle. This element also ascertains which of the performance characteristics exhibited by the vehicle operator are indicative of drowsiness.

The physical and performance characteristics that are found to be indicative of drowsiness are employed to determine if the vehicle operator is in danger of falling asleep. If so, an output signal indicating operator drowsiness is provided by the processor to activate the aforementioned alarm. The determination of imminent sleep can be made when at least one of the physical and performance characteristics exhibited by the vehicle operator is indicative of drowsiness. However, it is preferred that a voting logic be employed by the processor since particular ones of the physical and performance characteristics exhibited by the vehicle operator provide definite indications of drowsiness to a high degree of confidence, while the remainder provide a less definite indication of drowsiness. Thus, it is desirable to prioritize the various characteristics so that the alarm is not activated in error. Specifically, the processor would provide the output signal indicating operator drowsiness whenever either, one of the characteristics associated with a definite indication of drowsiness is present, or two or more of the characteristics providing a less definite indication of drowsiness are present.

The various optics described above could be mounted separately on the housing and the light focused thereby separately routed to the optical sensor. However, it is preferred that only one of the optics packages be in registration with the optical sensor at a time. Therefore, a device is included for moving the optics packages into (and out of) registration with the optical sensor during those times when their associated monitoring function is active.

It can be seen that all the stated objectives of the invention have been accomplished by the above-described embodiments of the present invention. In addition, other objectives, advantages and benefits of the present invention will become apparent from the detailed description which follows hereinafter when taken in conjunction with the drawing figures which accompany it.

DESCRIPTION OF THE DRAWINGS

The aforementioned and other features, aspects, and advantages of the present invention will become better understood with regard to the following description, appended claims, and accompanying drawings where:

FIG. 2 is a perspective view of a steering wheel of a vehicle with a housing containing the integrated vehicle operator monitoring system in accordance with the present invention shown mounted on a steering column.

FIG. 3 is a block diagram of a portion of the monitoring system of FIGS. 1a–c further depicting a cross-sectional view of a shutter mechanism.

FIG. 4 is perspective view showing a portion of the integrated vehicle operator monitoring system of FIGS. 1a–c with an alternate mounting scheme for the optical devices associated with the monitoring functions.

DETAILED DESCRIPTION OF THE PREFERRED EMBODIMENTS

Figure 1A:
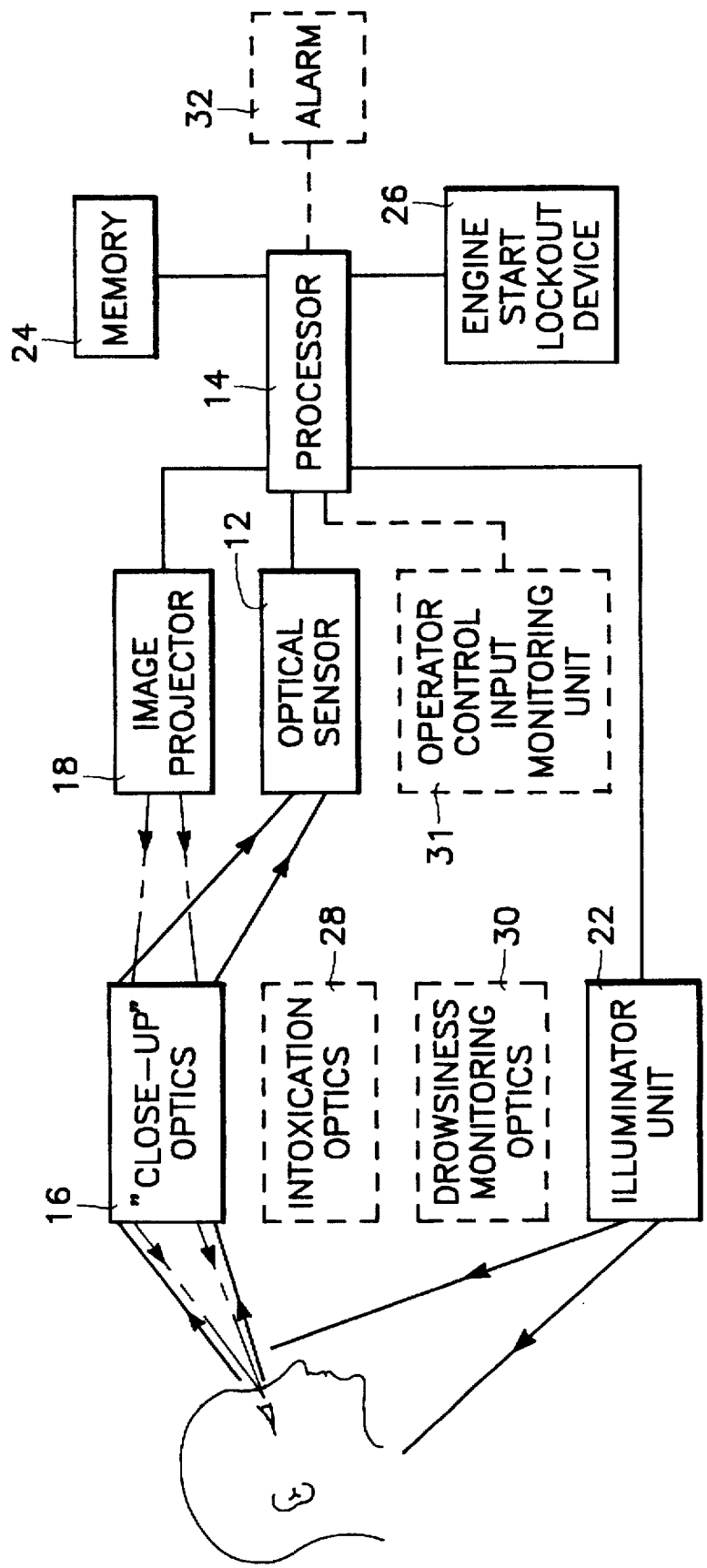
FIGS. 1a–c are block diagrams of an integrated vehicle operator monitoring system in accordance with the present invention. The components of the monitoring system involved in performing operator identity monitoring are depicted in FIG. 1a, the components involved in performing operator intoxication monitoring are depicted in FIG. 1b, and the components involved in performing operator drowsiness monitoring are depicted in FIG. 1c.
Figure 1B:
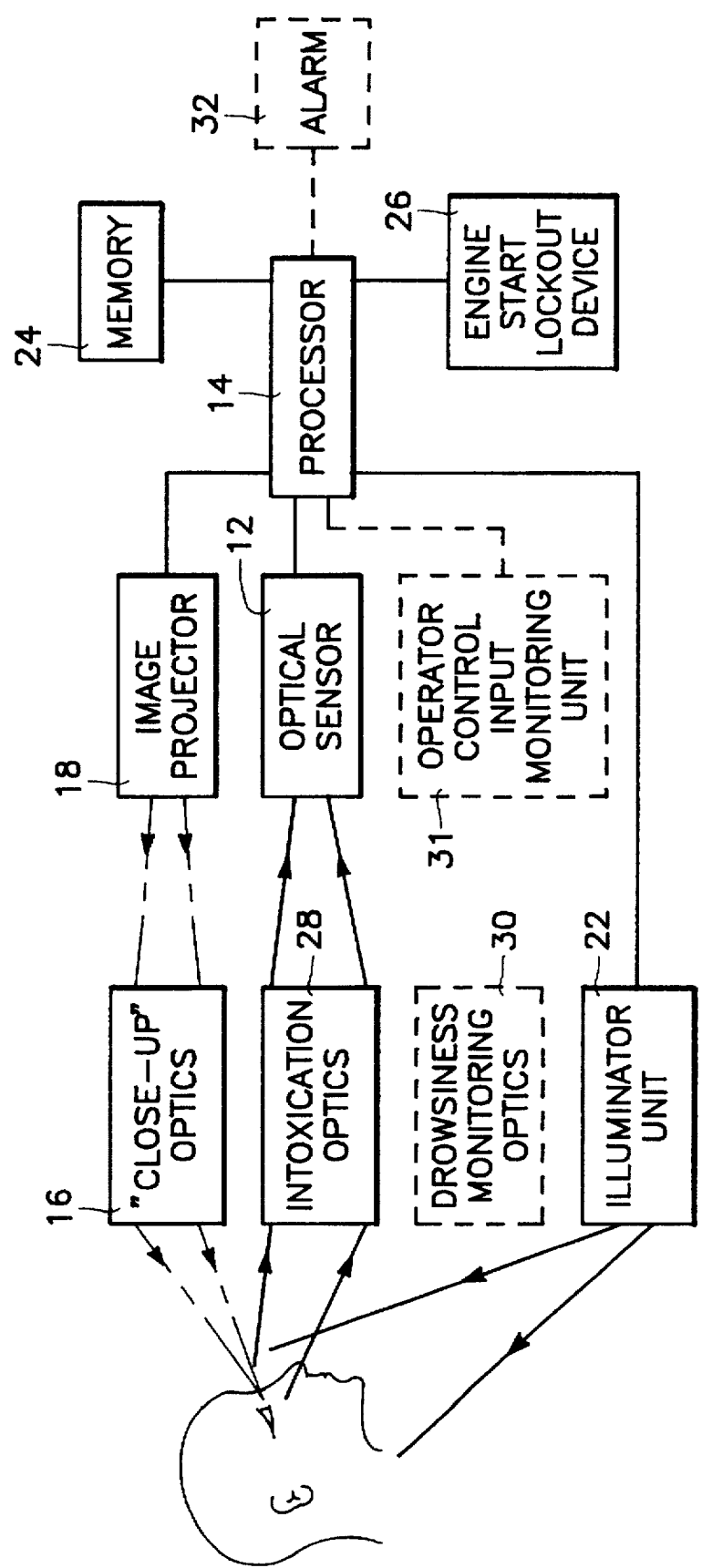
Figure 1C:
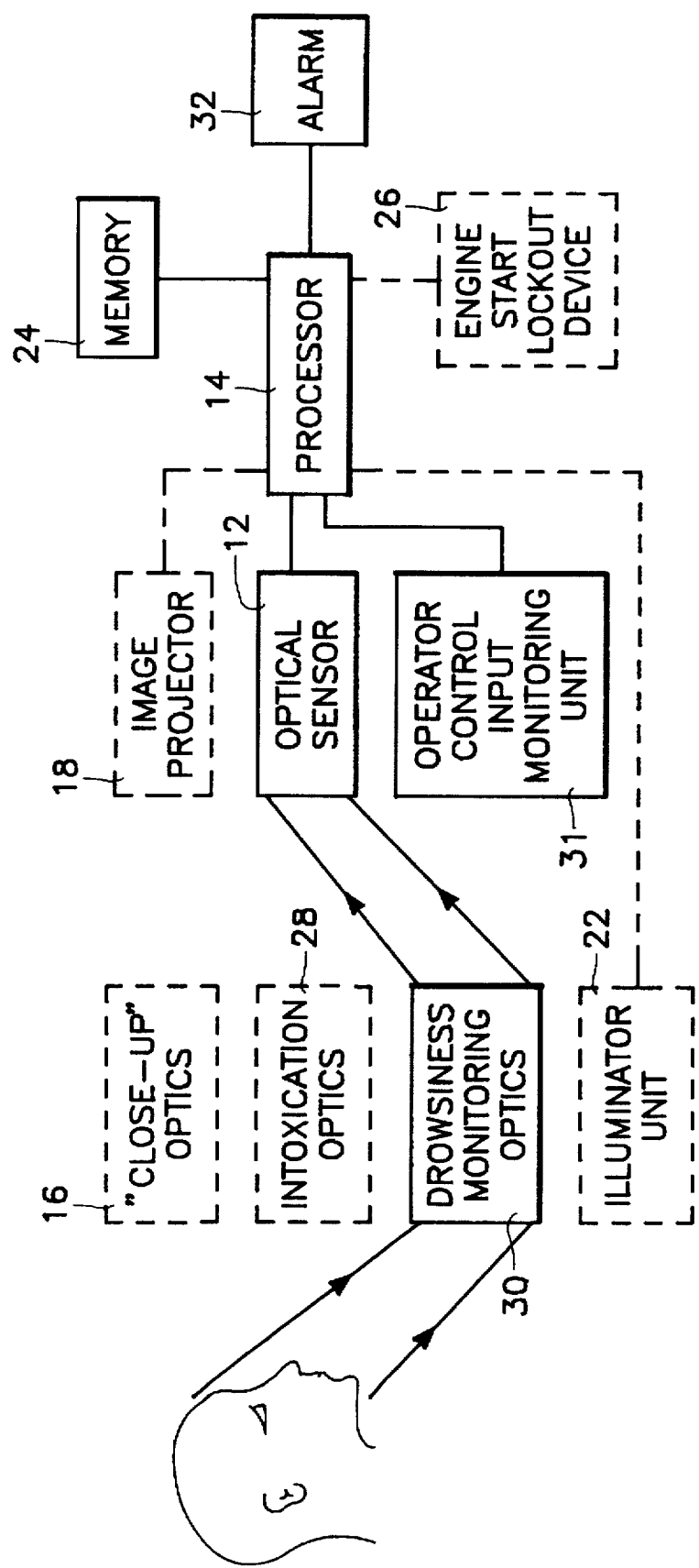

An integrated vehicle operator monitoring system in accordance with the present invention performs at least two, and preferably three operator monitoring functions. First, when an attempt is made to start the engine of the vehicle, the operator's identity can be checked to determine if he or she is authorized to operate the vehicle. Additionally, a determination as to whether the operator is too intoxicated to operate the vehicle can be made during this engine start-up attempt. And finally, the system can monitor the drowsiness of the operator while the engine is running, and provides a warning if he or she in danger of falling sleep. For convenience, the remainder of this detailed description section will be directed toward an system integrating all three of the aforementioned monitoring features. However, it is not intended to limit the present invention to such a system. Apparatuses and methods employing only two of the three monitoring function are also envisioned. The components that permit the integration of the three monitoring functions are illustrated in FIGS. 1a–c. It is preferred that the components of all three monitoring functions be incorporated into a single unit, and that they share common components. However, to ensure clarity in the following description, the embodiment of each monitoring function has been separately illustrated in FIGS. 1a–c, respectively. The components of the overall device not required in the monitoring function associated with a particular figure being described are shown in dashed lines.

In accordance with a preferred embodiment of the present invention, the operator's identity is checked when an attempt is made to start the engine of the vehicle by scanning the iris of one or both of the operator's eyes. The operator may be required to position his or her eye or eyes at a desired location via a simple alignment procedure to ensure an accurate image of the iris is obtained. Once an operator's eye is in position, it is illuminated by a light designed to highlight and contrast the features of the iris. An image of the iris is then obtained and compared to stored images of irises belonging to authorized drivers of the vehicle. This identification procedure using one or both of the operator's irises works because the iris of any human eye has a physical pattern unique to that eye, similar to the way a fingerprint is unique. No two iris patterns are exactly the same. If the comparison of the operator's iris matches a stored pattern, the operator is determined to be an authorized driver, and the vehicle's engine can be started. If no match exists, engine start-up is disabled.

Referring to FIG. 1a, the operator identity monitoring function is implemented by the use of a high resolution optical sensor 12 and a processor 14 for performing the verification. Narrow field-of-view "close-up" optics 16 are used to focus a highly detailed image of the operator's eye onto the sensor 12. It is preferred that the optics 16 be of a fixed focus type providing a field of view of at least 0.5 inches at a distance of 6.0 inches so that the details of the iris are readily discernible in the image focused on the sensor 12. The operator will be required to place one or both of his or her eyes at a location in relation to the optics 16 which will provide the best possible focused image on a sensing surface of the sensor 12. The optics 16 are preferably configured so that this location of optimum focus is convenient to the operator and requires only minimal movement on his or her part.

The aforementioned positioning of the operator's eye or eyes could entail looking into an eyepiece, or the like. However, it is preferred that a less obtrusive method be employed. For instance, the operator can be required to position his or her head at a point where a projected image can be seen in focus. The projected image would only come into focus when the operator's eye is at the location where the best possible image of the iris can be obtained. For example, dual images could be projected out of the optics 16 towards this location, via an image projector 18. Using the same optics 16 employed for identification purposes prevents any problems associated with parallax in the eye positioning method. The image projections would be configured such they both focus at only one spot in space. Projected image systems, such as the one just described, are well known in the art, and so will not be discussed in any further detail herein.

An illuminator unit 22 is used to illuminate the eye during imaging of the iris, as mentioned above. Preferably, this illuminator unit 22 produces eye safe levels of light at wavelengths which will best highlight or contrast the features of the iris that are to be used for identification purposes. It is believed an illuminator unit 22 capable of producing a single or multiple wavelengths of light in a spectral range from about the near infrared to the near ultraviolet would be well suited to the task. For example, the use of one or more oblique light sources, such as an LED or solid state laser, which are directed toward the eye and capable of producing one or more wavelengths of light, have been used successfully in past iris identification systems.

The sensor 12 itself is preferably a broad-band CCD array which provides a digital signal representing the pixelized image of the operator's eye to the processor 14. The processor 14 is used to compare the signal received by from the sensor 12 to stored data in an associated processor memory 24. This stored data is associated with the irises of authorized vehicle operators. The comparison and storage of iris data can be accomplished in several well known ways. For example, it is known to perform a pixel by pixel comparison in which the stored data is a pixel map of the iris of authorized operators and each pixel is represented by its intensity, spectral make-up, etc. If the stored pixel map matches the pixelized image provided by the sensor 12, within some predetermined tolerance, the operator is determined to be an authorized user of the vehicle. However, a comparison of this type could be quite sensitive to the conditions under which the stored image data was obtained in comparison to those present when the operator identity check is performed. For instance, the illumination of the eye might have to be precisely the same to obtain an accurate comparison. In addition, a pixel by pixel comparison can require a large amount of processing time and an extensive memory capability. Therefore, other known methods may be more appropriate. One of these well known alternate methods uses the digitized image signal to extract and encode unique information concerning the iris. For example, the color or size of certain iris features could be extracted and encoded into a data template. Once this information is encoded, it is compared to similar encoded information concerning the irises of authorized operators of the vehicle. Typically, the sensed information will not track element for element with the stored data, even if the operator is authorized and his or her iris information has been stored in the processor 14. This is at least partially due to potential variations in conditions between the time the stored information was obtained and those present at the time of the identity check. Thus, a method of deciding how many features must correspond, and to what degree, is employed to determine if a match exists with an acceptable level of confidence. If an acceptable match does exist between the data extracted from the sensor signal and one of the stored templates, the operator is deemed to be authorized to operate the vehicle.

Of course, inherent in either of the above-described comparison methods is the requirement for the processor 14 to find and isolate the iris within the signal representing the image of the eye output from the sensor 12. Further in the second described comparison method it is necessary to further locate and isolate various portions of the iris from the sensor signal. Therefore, the processor 14 according to the present invention includes this capability. The actual algorithms needed to allow the processor 14 to perform the aforementioned acquisition and isolation are well known in the art and have been employed in existing iris identification systems. Accordingly, no detailed description of these methods is provided herein.

As alluded to previously, the operator identity monitoring function can require one or both of the operator's irises to be scanned. The choice is a matter of balancing speed and simplicity with accuracy, and will depend on the specific application of the present invention. If only one iris is used to determine whether the operator is authorized to operate the vehicle, the identification process is less time consuming and requires less processing time and processor memory. However, if both eyes are scanned before the determination is made whether the operator is authorized, the level of confidence is raised. This results because any variations in the conditions between the time the iris data was taken and stored, and the actual operator identity check, can be mitigated by using comparison results for both eyes. For example, if the result of the comparison from one eye was anomalous, but positive for the second eye, the processor 14 can be programmed to accept the operator as authorized with a high degree of confidence. If however, only one iris had been scanned and the result were anomalous, an operator might be excluded from operating the vehicle even though he or she was authorized to do so.

Preferably, if a match is not found, the processor causes an engine start lockout device 26 to be activated. These devices are also well known and any appropriate model can be employed. Of course, the engine lockout device 26 could also be normally engaged, and the processor 14 would cause it to deactivate and allow engine start, if a match is found between the sensed imaged and a stored image indicating an authorized operator.

The operator intoxication monitoring function in accordance with the present invention entails sensing the operator's level of intoxication, and preventing start-up of the engine if the operator is too intoxicated to operate the vehicle. Recognition of an impaired driver relies on the fact that intoxicants, such as ethyl alcohol, and/or physiological by-products and other secondary biochemical changes resulting from the ingestion of an intoxicant, are present in the tear film coating the eye, and in the structures of the eye itself. These intoxicants, physiological by-products, and/or other secondary biochemical changes present in the tear film and eye result in the eye exhibiting unique light absorption and fluorescence emission patterns which are substantially different than those exhibited in the absence of an intoxicant in the body. The term light absorption and fluorescence emission patterns refers to the intensity of the various wavelengths of light present in light reflected and/or emitted from the eye. This intensity pattern of the reflected and/or emittted light varies significantly between an operator having no intoxicants in his or her body, and an operator with intoxicants present. In addition, different intoxicants will produce significantly different intensity patterns, with the exception that certain chemically similar intoxicants (e.g. heroin and morphine) may produce patterns which are only slightly different. Thus, it is possible to detect the presence of an intoxicant in an operator's body, and for the most part its type, from the aforementioned emission pattern. Further, the concentration of an intoxicant in an operator's body will produce proportionate concentrations of the intoxicant and/ or its physiological by-products (and other secondary biochemical changes) in the tear film and structures of the eye. A variation in the levels of the intoxicant and/or its physiological by-products will produce a corresponding variation in the emission pattern. Accordingly, it is also possible to quantify the level of an intoxicant in an operator's body by analyzing the emission pattern of the light from his or her eye. The emission patterns attributable to an intoxicant and/or its physiological by-products (and other secondary biochemical changes) are also in most cases substantially consistent from one individual to the next, as is the concentration of these factors in the eye relative to the concentration of the intoxicant in an operator's body. Thus, the intoxicant detection process is not dependent on knowing the specific emission patterns exhibited by the eye of a particular operator, but can rely on generic patterns which are substantially the same for all individuals.

Given the above-explained relationship between intoxication and the absorption and fluorescence emission patterns exhibited by an operator's eye, it can be seen that light reflected or emitted from the eye can be collected and used to identify and quantify the intoxicants which have diffused from the operator's body into his or her tear film and eye structures. Thus, for instance, the operator's blood alcohol level can be determined by imaging and analyzing the emission patterns of the light. To image the aforementioned emission pattern, one of the operator's eyes is illuminated by a broad-band light source producing eye-safe levels of light in a range from about near infrared to near ultra-violet. This illumination is done when an attempt is made to start the engine of the vehicle. Preferably, it is done contemporaneously with the illumination step of the aforementioned operator identity check, while the operator's eye is still at the position which will produce an optimum image of the eye. Light reflected or emitted from the operator's eye is collected, spectrally separated to create the aforementioned emission patterns, and focused on an optical detector. This pattern is then compared to known patterns representing the emission patterns from eyes of individuals under the influence of various intoxicants, and at various levels of intoxication. If unacceptable levels of intoxicants are determined to be present in the operators body, the vehicle cannot be started.

In reference to FIG. 1b, the operator intoxication monitoring function is implemented by the use of an illuminator unit 22 capable of producing the aforementioned spectrum of light. Preferably, this illuminator unit 22 is the same one employed in the operator identity check procedure. Light reflected or emitted from the tear film and structures of the eye is captured by an operator intoxication optics set 28. This optic set 28 includes the optical elements necessary to collect light reflected or emitted from the operator's eye, diffract the captured light, and focus it onto an optical sensor 12. As the particular types of lenses and diffraction grating required to accomplish this task are well known and can be easily assembled by a skilled individual for the specific application attempted, no further details on the make-up of the optics set 28 will be provided herein. The diffracting element of the optics set 28 spectrally separates the light and creates the aforementioned absorption and fluorescence emission pattern exhibited by the operator's eye. Essentially, this pattern consists of bands of light of differing wavelengths, wherein each band represents the absorbance and fluorescence of the operator's tear film and eye at that wavelength. The diffracted light is then focused by the optics set 28 onto the sensing surface of the optical sensor 12, preferably with a resolution of 5.0 nm or better. The optics set 28 is configured such that when the operator's eye is in the aforementioned desired position, the best possible focused image is presented to the sensor 12. Preferably, the optical sensor 12 is the same sensor used in connection with the operator identity monitoring system described above, i.e. a broad band CCD array, and is sensitive to the complete spectrum of light emitted from the illuminator 22. The optical sensor 12 is used like a multi-channel spectrometer, wherein the signal output from the sensor 12 represents the intensity of each element in the sensor array. A processor 14, which is preferably the same processor used in conjunction with checking the identity of the operator, determines from the output signal of the sensor 12, the overall intensity of light at each wavelength. This is done by equating the various sensor array element positions to one of the aforementioned wavelength band. Thus, the intensity the reflected or emitted light at a particular wavelength is determined by monitoring the signal from the sensor array elements equated to the corresponding band on the sensor's sensing surface. Of course, the physical size of each array element will actually result in a range of wavelength bands being equated to particular sensor positions. However, sensor arrays 12 are available with small enough array elements that the range of wavelength bands equated to a line of these array elements will be narrow enough to provide an adequate differentiation in the spectrum to serve the purpose of distinguishing between emission patterns for intoxication identification purposes.

The processor 14 having determined the intensity of the reflected or emitted light at each wavelength, or rather each range of wavelengths as explained above, compares the resulting intensity pattern to patterns stored in the processor memory 24. This can be accomplish by any appropriate well known comparison method. For instance, data corresponding to the intensity of each wavelength range, or specific ones of these ranges which are most significant to the intoxicants being screened for, could be extracted from the sensor signal and compared to similar data representing intensities at the same wavelength ranges corresponding to the presence of specific intoxicants and their levels in the body. The aforementioned stored intensity (i.e. emission) pattern data can be easily derived by using the above-described intoxication detection apparatus. The signal from the sensor 12 representing emission patterns of light reflected or emitted from the eyes of subjects under the influence of specific intoxicants (or even combinations of intoxicants), at various levels of intoxication, would be monitored and recorded. The data required to create the aforementioned stored patterns would be derived from these recorded signals by determining the significant portions of the signal which clearly distinguish it from that produced when testing an unintoxicated subject, or a subject at a different level of intoxication. Of course, to save memory space and processing time, it would be possible to only store data corresponding to unacceptable levels of an intoxicant in the body of an operator. An unacceptable level of intoxication would be determined by a user of the intoxication monitoring system, and would probably vary depending on the type of intoxicant and the vehicle being operated. For instance, a commercial shipping company may wish to preclude operation of its vehicle if any alcohol is present in an operator's body, rather than just levels exceeding the so-called maximum legal blood alcohol level.

If the processor 14 finds a match between the data derived from the light reflected or emitted from the operator's eye and one of the stored data patterns, and this pattern indicates the operator is too intoxicated to operate the vehicle, the processor 14 causes the engine start lockout device 26 to be activated.

In addition to the processor 14 activating the engine start lockout device if an unauthorized or intoxicated operator is detected, the operator's condition and status could be communicated to the appropriate authority for action. For instance, a message identifying the vehicle or operator, and possibly its location, could be transmitted to these authorities by a RF signal. Systems capable of this communication are well known and could be easily integrated into the present invention.

The operator drowsiness monitoring function in accordance with the present invention is accomplished by monitoring certain physical and performance characteristics of an operator which are indicative of drowsiness. Each individual characteristic monitored is prioritized and a voting logic is employed to decide if the vehicle operator is about to fall asleep. If such a condition is detected, a warning is provided to the operator. Preferably, this warning is some type of sensible alarm which will rouse the operator.

The aforementioned physical characteristics can include any of the well known indicators of imminent sleep, such as the position and movement of the operator's head, the frequency of his or her blinking, the duration of eye closure, or the position of a person's eyelids. For example, when an operator is drowsy his or her head may slump, his or her eyelids may droop, and/or his or her eyes may stay shut longer than normal. In addition, it is believed that other physical characteristics can be used as indicators of imminent sleep as well. For instance, it is believed that the velocity of eyelid movement can be used to detect drowsiness. A drowsy person eyelids tend to close and open at a slower velocity than when he or she is alert. Other potential physical characteristic indicative of imminent sleep may be the direction of a person's gaze, his or her eye position and motion especially in comparison to the other eye, and iris and pupil motion. As for the aforementioned performance characteristics, one well known indicator of an operator's drowsiness is steering wheel movements in an automobile. In such a system, the number of steering operations in a unit of time (e.g. one minute), and the angle of excursion of each operation from some set reference, are monitored. It is known that a drowsy operator will exhibit a decrease in the frequency of steering operations and the excursion of these operations will increase. The monitored movements are compared to a stored pattern which is indicative of an alert driver. If the monitored pattern shows a significantly lower steering frequency and larger excursions, it is determined that the operator is drowsy. In addition, to the monitoring of steering wheel movements, it is believed other performance characteristics could also be used as indicator of imminent sleep. For example, the course and speed of a vehicle could be monitored. A drowsy operator would tend the stray from a steady course and vary speed to a greater extent than an alert operator. Any one of these attributes, or a combination thereof can be used to monitor the drowsiness of the operator.

The above-described indicators of drowsiness when viewed in isolation may not always give an accurate picture of the operator's alertness level. From time to time circumstances other than drowsiness might cause the aforementioned characteristic to be exhibited. For example, the glare of headlights from an oncoming automobile at night might cause a driver to squint thereby affecting his or her eyelid position, blink rate, and other eye-related factors. Or, an operator may be forced to avoid obstacles in his or her path, thereby skewing the normal steering wheel operations enough to mimic drowsiness. Accordingly, when viewed alone, any one indicator could result in a false determination of operator drowsiness. However, if multiple factors are monitored and evaluated, the chance of a false indication can be reduced significantly. Of course, some indicators can be more definite than others, and thus should be given a higher priority. For instance, if eye closure time is monitored and indicates the operator eyes are closed for a long period of time, this is a very definite indicator of drowsiness (if not sleep). Whereas, other indicators may not be as reliable, such as the eyelid position and steering wheel movements alluded to above. Accordingly, it is preferred that a voting logic be employed which will assist in the determination whether an operator is drowsy, or not. This voting logic could result in an immediate indication of drowsiness if a more definite indicator is detected, but require two or more of lesser indicators to be detected before a determination of drowsiness is made. For example, assume that eyelid closure time and steering wheel movements are monitored as indicators in determining if an operator is in danger of falling asleep. If it is discovered that the operator's eyes stay closed for more than a predetermined period of time (i.e. an amount of time which provides a high confidence that the operator is falling or has fallen asleep), an immediate indication of drowsiness would be given. However, if the operator's eyes are determined to be closed for less than the aforementioned predetermined period, but still closed for a period of time longer than is typical of a fully alert operator, a determination of drowsiness would be made only if the monitored steering movements also indicated the operator was falling asleep. If not, the monitoring cycle would continue. Likewise, if it is discovered that the steering movements are indicative of imminent sleep, but the eye closure time is in the alert range, no determination of drowsiness would be made and the monitoring would continue. It is pointed out that the preceding illustration of a voting logic is provided as an example only. It is not intended that the operator drowsiness monitoring function of the present invention be limited to the specific indicators discussed, or that only two indicators be employed. In fact, it is believed that additional indicators would make the drowsiness determination process even more reliable.

As shown in FIG. 1c, the operator drowsiness monitoring function is implemented in part by the use of drowsiness monitoring optics 30. The optics 30 are used to image the operator's head and eyes during operation of the vehicle, and focus the image on the sensor 12. To accomplish this task, the optics 30 must have a relatively wide angle view in comparison to those employed in the other monitoring functions, since the operator's whole head is imaged, rather than just his or her eye. A processor 14 will monitor and analyze the signal output from the sensor 12. Preferably, the same sensor (i.e. a CCD array producing a digital output) and processor employed in the operator identification and intoxication monitoring systems is used here as well. The processor 14 processes the signal from the sensor to detect one or more of the aforementioned physical characteristics indicative of operator drowsiness. In addition, an operator control input monitoring unit 31 is connected to processor 14. This monitoring unit 31 provides the processor with one or more indications that the operator is drowsy based on certain monitored performance characteristics of the operator. For example, the monitoring unit 31 would preferably provide the processor 14 with an indication of operator drowsiness whenever such is determined from a monitoring the operators movements of a steering control device (e.g. a steering wheel of an automobile). Monitoring units for indicating drowsiness based on steering control device movements are known in the art. Accordingly, no detailed description is provided herein.

The processor 14 uses the indicators of drowsiness obtained through processing of the sensor signal and the signal received from the operator control input monitoring unit 31, to make a determination whether the operator is about to fall asleep. To accomplished this task, the processor 14 employs a voting logic, such as that described previously. If the processor 14 makes a determination that the operator is drowsy, it causes an alarm 32 to activate. This alarm can be any type which will rouse the operator, and can be directed at any one or more of the operator's senses. For example, an audible alarm might be sounded alone or in conjunction with flashing lights. Other examples of alarm mechanisms that might be used include those producing a vibration or shock to the operator. Even smells might be employed. It is known certain scents induce alertness.

There are well known systems for determining whether an operator is drowsy by imaging certain physical characteristics, such as those monitoring an operator's eye closure time or eyelid/head position. Generally, the image processing employed in these systems first identifies the head and/or eye of the operator within the image signal from a sensor. Once the portion of the image corresponding to the physical characteristic which is then being analyzed is isolated (e.g. the head to analyze head droop or the eyes to analyze eyelid position), a comparison is made between a monitored image of the operator's head and eyes, or data derived therefrom, to stored image pixel maps or data corresponding to the physical characteristics of an alert operator (or sometimes of a drowsy driver). This same type of processing is preferably employed in the processor 14 according to the present invention. Specifically, the aforementioned image pixel maps or derived data are stored in the processor memory 24. The processor 14 compares the stored images retrieved from the memory 24 to the image of the operator represented by the signal from the sensor 12. For instance, the image of the operators head and/or eyelid position derived from the sensor signal could be compared to stored image pixel maps or data representing the head and/or eyelid positions typical of the operator in an alert state. If no comparison is found, the processor 14 makes a determination that the physical characteristic being monitored is indicative of the operator's imminent sleep. This determination is then employed in the aforementioned voting logic to determine if the alarm 32 is to be activated. Alternately, the sensed images could be compared to stored images representing drowsy operators. In this case the determination that a physical characteristic is indicative of imminent sleep would be found if a match existed. As the programming and specific devices required to perform the just-described signal processing are well known in the art, no detailed description will be provided herein.

As discussed above, the operator drowsiness monitoring function includes a capability to track the head and eyes of the operator within the image signal from the sensor 12. This feature is desirable because the vehicle operator will typically move his or her head periodically during operation of the vehicle. Thus, the tracking feature will improve the performance of the operator drowsiness monitoring because this monitoring occurs during operation of the vehicle. In addition, the operator identity check could be periodically repeated while the engine is running to ensure an authorized operator is still at the wheel. For instance, the identity check could be performed any time the operators head goes out of view of the optical sensor and then returns. This repeated identity check would prevent an unauthorized operator from hijacking the vehicle after it has been started. If an unauthorized operator is detected when the engine is running, a graceful shutdown technique could be employed. A graceful shutdown might entail disabling the vehicle in a safe way, such as automatically shutting off the engine when the vehicle comes to a stop, or disrupting fuel flow so as to fake an empty fuel tank causing the driver to pull over. Of course, this repeated identity check would require that the operator position his head at the previously-described desired location. Accordingly, it is desirable that this location be at a place where the operator can still conveniently operate the vehicle while the check is performed.

The above-described monitoring systems are preferably integrated into a single housing 10, which is mounted unobtrusively, yet functionally near the operator. For example, if the vehicle is a car or truck, the housing 10 could be mounted on the steering column, as shown in FIG. 2.

The optics employed in the operator identity, intoxication, and drowsiness monitoring functions could be mounted in separate locations on the surface of the housing facing the operator, and the light passing therethrough routed to the sensor. If so, light transmitted from the optical devices 16, 28, 30 could go through free space, as shown in FIGS. 1a–c, or alternately, the light could be transferred to the sensor 12 via fiber optic lines (not shown). Of course, in either case, if a single sensor is used and it is desired to focus the image over its entire sensing surface, some provision must be made to prevent light from the optical devices not being employed in the active monitoring function from interfering with the light from the optical device associated with the active monitoring function. This can be done in a myriad of well known ways. For example, as shown if FIG. 3, a simple shutter mechanism 36 under the control of the processor 14 could be employed. The processor 14 would cause the shutter to block the optics associated with the inactive monitoring functions, while letting light pass from the optics associated with the active monitoring function. This would work quite well in the case where the light from the optical devices 16, 28, 30 is being transferred through free space. In the case where fiber optic lines are used, electro-optical switches of the type well known in fiber optic communications, could be employed. Each optical device would have an associated electro-optical switch (not shown) under the control of the processor. The processor would cause the switches corresponding to the optical device associated with an inactive monitoring function to block light output, whereas the switch corresponding to the optical device of the active monitoring function would be set to allow the light to pass.

An alternate embodiment according to the present invention would forego the separate optical device mounting scheme. In this alternate embodiment the optics packages are mounted in the housing such they can be mechanically swapped so only the optical device associated with the active monitoring function is positioned in view of the operator. Thus, only a single path need be established between an active optical device and the sensor. As before, this single path could be via free space, or via a fiber optic cable. One possible configuration of this alternate embodiment is shown in FIG. 4, wherein the optics pakages 16, 28, 30 are mounted on a rotating disc 38 which is rotated by a motor 40 under control by the processor 14. The processor 14 causes the appropriate optical device 16, 28, 30 to be rotated into the active position when its associated monitoring function is being performed.

While the invention has been described in detail by reference to the preferred embodiments described above, it is understood that variations and modifications thereof may be made without departing from the true spirit and scope of the invention. For example, the three operator monitoring systems previously described could be used in combination for applications not involving the operation of a vehicle. For example, the operator identity, intoxication, and drowsiness check systems could be useful for monitoring air traffic controllers or military personnel manning weapons control stations.

Wherefore, what is claimed is:

1. An integrated vehicle operator monitoring system for a vehicle, comprising:

an optical operator intoxication monitor optically capable of monitoring reflected and emitted light patterns from an eye of the vehicle operator and comparing the monitored light patterns to reflected and emitted light patterns indicative of an intoxicated operator so as to determine if the operator is too intoxicated to operate the vehicle.

2. The monitoring system of claim 1, further comprising:

an optical operator identity monitor capable of determining if a vehicle operator is authorized to operate the vehicle.

3. The monitoring system of claim 1, further comprising:

an optical operator drowsiness monitor capable of monitoring the vehicle operator for drowsiness while the vehicle operator is operating the vehicle.

4. The monitoring system of claim 2, wherein the operator identity monitor comprises:

an optical sensor having a sensing surface;

operator identity monitoring optics capable of focusing an image of an eye of the vehicle operator on the sensing surface of the optical sensor;

a memory for storing data associated with predetermined characteristics of the irises of vehicle operators' eyes who are authorized to operate the vehicle; and, an authorized operator determination apparatus capable of determining if the vehicle operator is authorized to drive the vehicle from a signal output by the optical sensor representing an image of the vehicle operator's eye and the stored data.

5. The monitoring system of claim 4, wherein the authorized operator determination apparatus comprises:

a processor comprising,
    a first processor portion for deriving data corresponding to said predetermined characteristics of the vehicle operator's iris from the signal output by the optical sensor representing an image of the vehicle operator's eye,
    a second processor portion for comparing the derived data with the stored data associated with the irises of authorized vehicle operators, and,
    a third processor portion for indicating either that (i) the vehicle operator is authorized to operate the vehicle whenever a substantial match is found between the derived data and the stored data, or (ii) the vehicle operator is not authorized to operate the vehicle when no substantial match is found between the derived data and the stored data.

6. The monitoring system of claim 4, wherein the operator identity monitor further comprises:

an illuminator for illuminating the eye of the vehicle operator to highlight and contrast said predetermined characteristics of the vehicle operator's iris.

7. The monitoring system of claim 6, wherein:

the illuminator is capable of producing at least one wavelength of light in a range from about near infrared to near ultraviolet.

8. The monitoring system of claim 4, further comprising:

a housing; and an indicator capable of indicating to the vehicle operator a position in reference to the housing of the integrated vehicle operator monitoring system where the operator is required to position at least one of the operator's eyes such that the operator identity monitoring optics provides a best possible focused image at the sensing surface to the optical sensor.

9. The monitoring system of claim 8, wherein the indicator comprises:

an image projector capable of projecting a two-part image wherein the two parts of the image come to a focus only at said position where the operator is required to position said one at least of the operator's eyes.

10. The monitoring system of claim 1, wherein the operator intoxication monitor comprises:

an optical sensor having a sensing surface;

operator intoxication monitoring optics capable of collecting light reflected and emitted from an eye of the vehicle operator, spectrally separating the collected light to form an absorbance and fluorescence emission pattern, and focusing the spectrally separated light on the sensing surface of the optical sensor;

a memory for storing data sets respectively associated with an absorbance and fluorescence emission pattern formed from spectrally separated light reflected and emitted from an eye of an intoxicated person, wherein each of said stored data sets represents one of (i) a particular intoxicant and an associated concentration of that intoxicant in the body of the vehicle operator, or (ii) a particular combination of intoxicants and associated concentrations of that intoxicant in the body of the vehicle operator; and, a comparator for determining if the vehicle operator is too intoxicated to drive the vehicle from a signal output by the optical sensor and the stored data sets.

11. The monitoring system of claim 10, wherein the comparator comprises:

a processor comprising, a first processor portion for deriving data associated with an absorbance and fluorescence emission pattern formed from spectrally separated light reflected and emitted from the eye of the vehicle operator from the signal output by the optical sensor, a second processor portion for comparing the derived data with the stored data sets, and, a third processor portion for indicating either that (i) the vehicle operator is too intoxicated to operate the vehicle whenever a substantial match is found between the derived data and any stored data set, or (ii) the vehicle operator is not too intoxicated to operate the vehicle when no substantial match is found between the derived data and any stored data set.

12. The monitoring system of claim 10, wherein:

the operator intoxication monitoring optics is capable of focusing the spectrally separated light on the sensing surface of the optical sensor with a resolution of at least 5.0 nm.

13. The monitoring system of claim 10, wherein the operator intoxication monitor further comprises:

an illuminator for illuminating the eye of the vehicle operator with eye-safe levels of light having a spectral range from about near infrared to near ultraviolet.

14. The monitoring system of claim 10, further comprising:

a housing; and an indicator capable of indicating to the vehicle operator a position in reference to the housing of the integrated vehicle operator monitoring system where the operator is required to position one of the operator's eyes such that the operator intoxication monitoring optics provides a best possible focused image at the sensing surface to the optical sensor.

15. The monitoring system of claim 14, wherein the indicator comprises:

an image projector capable of for projecting a two-part image wherein the two parts of the image come to a focus only at said position where the operator is required to position the one of the operator's eyes.

16. The monitoring system of claim 3, wherein the operator drowsiness monitor comprises:

an optical sensor having a sensing surface;

operator drowsiness monitoring optics capable of focusing an image of the vehicle operator's head and eyes on the sensing surface of the optical sensor;

a memory for storing image data associated with physical characteristics of a vehicle operator's head and eyes which are one of (i) indicative of drowsiness, or (ii) indicative of alertness; and, an isolator capable of isolating from a signal output by the optical sensor that portion corresponding to said physical characteristics;

an indicator for indicating from the isolated portion of the signal and the stored image data which of the physical characteristics exhibited by the vehicle operator are indicative of drowsiness.

17. The monitoring system of claim 16, wherein the indicator comprises:

a processor comprising, a first processor portion for deriving image data corresponding to said physical characteristics of the vehicle operator's head and eyes from the signal output by the optical sensor; and a second processor portion for comparing the derived image data with the stored image data.

18. The monitoring system of claim 16, further comprising:

a performance monitor for monitoring performance characteristics associated with the vehicle operator's actions to control of the vehicle; and a discriminator for ascertaining which of the performance characteristics exhibited by the vehicle operator are indicative of drowsiness.

19. The monitoring system of claim 18, further comprising:

a physical and performance characteristic monitor for determining from the physical and performance characteristics exhibited by the vehicle operator which are indicative of drowsiness if the vehicle operator is in danger of falling asleep and providing an output signal indicating operator drowsiness.

20. The monitoring system of claim 19, wherein:

at least one of the physical and performance characteristics exhibited by the vehicle operator must be indicative of drowsiness to cause the physical and performance characteristic monitor to output said output signal indicating operator drowsiness.

21. The monitoring system of claim 19, wherein:

particular ones of the physical and performance characteristics exhibited by the vehicle operator provide definite indications of drowsiness to a high degree of confidence, while the remainder provide a less definite indication of drowsiness; and the physical and performance characteristic monitor outputs said output signal indicating operator drowsiness whenever one of (i) any one of the characteristics providing a definite indication of drowsiness is present, or (ii) two or more of the characteristics providing a less definite indication of drowsiness are present.

22. An integrated vehicle monitoring system for a vehicle comprising:

an optical operator drowsiness monitor capable of monitoring the vehicle operator for drowsiness while the vehicle operator is operating the vehicle;

an optical operator identity monitor capable of determining if a vehicle operator is authorized to operate the vehicle; and an optical intoxication monitor capable of monitoring reflected and emitted light patterns from an eye of the vehicle operator and comparing the monitored light patterns to reflected and emitted light patterns indicative of an intoxicated operator so as to determine if the operator is too intoxicated to operate the vehicle.

23. A method of monitoring an operator of a vehicle, comprising the step of:

monitoring operator intoxication by monitoring reflected and emitted light patterns from an eye of the vehicle operator and comparing the monitored light patterns to reflected and emitted light patterns indicative of an intoxicated operator so as to determine if the operator is too intoxicated to operate the vehicle.

24. The method of claim 23, further comprising the step of:

preventing the operator from operating the vehicle whenever the vehicle operator is intoxicated.

25. The method of claim 23, wherein the monitoring method includes a step of monitoring operator drowsiness, and wherein the step of monitoring operator drowsiness comprises the steps of:

focusing an image of the vehicle operator's head and eyes on a sensing surface of an optical sensor;

storing image data associated with physical characteristics of a vehicle operator's head and eyes which are one of (i) indicative of drowsiness, or (ii) indicative of alertness; and, isolating from a signal output by the optical sensor that portion corresponding to said physical characteristics;

indicating from the isolated portion of the signal and the stored image data that of the physical characteristics exhibited by the vehicle operator are indicative of drowsiness.

26. The method of claim 23, wherein the monitoring method includes a step of monitoring operator identity, and wherein the step of monitoring operator identity comprises the steps of:

focusing an image of an eye of the vehicle operator on a sensing surface of the optical sensor;

storing data associated with predetermined characteristics of the irises of vehicle operators' eyes who are authorized to operate the vehicle; and, determining if the vehicle operator is authorized to drive the vehicle from a signal output by the optical sensor representing an image of the vehicle operator's eye and the stored data.

27. The method of claim 26, wherein the determining step comprises the step of:

deriving data corresponding to said predetermined characteristics of the vehicle operator's iris from the signal output by the optical sensor representing an image of the vehicle operator's eye;

comparing the derived data with the stored data associated with the irises of authorized vehicle operators; and, indicating either that (i) the vehicle operator is authorized to operate the vehicle whenever a substantial match is found between the derived data and the stored data, or (ii) the vehicle operator is not authorized to operate the vehicle when no substantial match is found between the derived data and the stored data.

28. The method of claim 26, wherein the step of monitoring operator identity further comprises the step of:

illuminating the eye of the vehicle operator to highlight and contrast said predetermined characteristics of the vehicle operator's iris.

29. The method of claim 28, wherein the illuminating step comprises the step of:

illuminating the eye of the vehicle operator with a light having at least one wavelength in a range from about near infrared to near ultraviolet.

30. The method of 26, further comprising the step of:

indicating to the vehicle operator a position in reference to the housing of the integrated vehicle operator monitoring system where the operator is required to position at least one of the operator's eyes such that the operator identity monitoring optics provides a best possible focused image at the sensing surface to the optical sensor.

31. The method of claim 30, wherein the indicating step comprises the step of:

projecting a two-part image wherein the two parts of the image come to a focus only at said position where the operator is required to position the at least one of the operator's eyes.

32. The method of claim 27, wherein:

the focusing step comprises first focusing an image of a first eye of the vehicle operator on the sensing surface of the optical sensor, then focusing an image of the second eye of the vehicle operator on the sensing surface of the optical sensor; and, the indicating step comprises indicating either that (i) the vehicle operator is authorized to operate the vehicle whenever a substantial match is found between the derived data and the stored data for at least one of said first and second eyes of the vehicle operator, or (ii) the vehicle operator is not authorized to operate the vehicle when no substantial match is found between the derived data and the stored data for either of the vehicle operator's eyes.

33. The method of claim 23, wherein the step of monitoring operator intoxication comprises the steps of:

collecting light reflected and emitted from an eye of the vehicle operator;

spectrally separating the collected light to form an absorbance and fluorescence emission pattern;

focusing the spectrally separated light on a sensing surface of an optical sensor;

sensing the respective intensities of various groups of the spectral components of the spectrally separated light;

producing a signal representative of said respective intensities;

storing data sets respectively associated with an absorbance and fluorescence emission pattern formed from spectrally separated light reflected and emitted from an eye of an intoxicated person, wherein each of said stored data sets represents one of (i) a particular intoxicant and an associated concentration of that intoxicant in the body of the vehicle operator, or (ii) a particular combination of intoxicants and associated concentrations of that intoxicant in the body of the vehicle operator; and, determining if the vehicle operator is too intoxicated to drive the vehicle from a signal output by the optical sensor and the stored data sets.

34. The method of claim 33, wherein the determining step comprises the steps of:

deriving data associated with an absorbance and fluorescence emission pattern formed from spectrally separated light reflected and emitted from the eye of the vehicle operator from the signal representative of said respective intensities of said various groups of the spectral components of the spectrally separated light;

comparing the derived data with the stored data sets, and, indicating either that (i) the vehicle operator is too intoxicated to operate the vehicle whenever a substantial match is found between the derived data and any stored data set, or (ii) the vehicle operator is not too intoxicated to operate the vehicle when no substantial match is found between the derived data and any stored data set.

35. The method of claim 33, further comprising the step of:

illuminating the eye of the vehicle operator with eye-safe levels of light having a spectral range from about near infrared to near ultraviolet.

36. The method of claim 33, further comprising the step of:

indicating to the vehicle operator a position in reference to the housing of the integrated vehicle operator monitoring system where the operator is required to position one of the operator's eyes such that the operator intoxication monitoring optics provides a best possible focused image at the sensing surface to the optical sensor.

37. The method of claim 25, further comprising the step of:

activating an alarm whenever the operator is drowsy.

38. The method of claim 25, wherein the indicating step comprises:

deriving image data corresponding to said physical characteristics of the vehicle operator's head and eyes from the signal output by the optical sensor, comparing the derived image data with the stored image data.

39. The method of claim 25, further comprising the steps of:

monitoring performance characteristics associated with the vehicle operator's actions to control of the vehicle; and ascertaining which of the performance characteristics exhibited by the vehicle operator are indicative of drowsiness.

40. The method of claim 39, further comprising the step of:

determining from the physical and performance characteristics exhibited by the vehicle operator which are indicative of drowsiness if the vehicle operator is in danger of falling asleep; and providing an output signal indicating operator drowsiness.

41. The method of claim 40, wherein the determining step comprises:

providing said output signal indicating operator drowsiness whenever at least one of the physical and performance characteristics exhibited the vehicle operator is indicative of drowsiness.

42. The method of claim 40, wherein:

particular ones of the physical and performance characteristics exhibited by the vehicle operator provide definite indications of drowsiness to a high degree of confidence, while the remainder provide a less definite indication of drowsiness; and wherein the determining step comprises providing said output signal indicating operator drowsiness whenever one of (i) any one of the characteristics providing a definite indication of drowsiness is present, or (ii) two or more of the characteristics providing a less definite indication of drowsiness are present.

43. The monitoring system of claim 3, further comprising:

an alarm capable of being activated whenever the operator drowsiness monitoring means indicates the vehicle operator is drowsy.

44. The monitoring system of claim 1, further comprising:

a vehicle disabling apparatus for preventing the operator from operating the vehicle whenever the operator intoxication monitor indicates the vehicle operator is too intoxicated to operate the vehicle.

45. The monitoring system of claim 2, further comprising:

a vehicle disabling apparatus for preventing the operator for operating the vehicle whenever the operator identity monitor indicates the vehicle operator is not authorized to operate the vehicle.

46. The monitoring system of claim 22, wherein:

the operator identity monitor comprises:

an operator identification optical sensor having a sensing surface, operator identity monitoring optics capable of focusing an image of an eye of the vehicle operator on the sensing surface of the optical sensor, a memory for storing data associated with predetermined characteristics of the irises of vehicle operators' eyes who are authorized to operate the vehicle, and, an authorized operator determination apparatus capable of determining if the vehicle operator is authorized to drive the vehicle from a signal output by the optical sensor representing an image of the vehicle operator's eye and the stored data;

the operator intoxication monitor comprises:

an operator intoxication optical sensor having a sensing surface, operator intoxication monitor capable of collecting light reflected and emitted from an eye of the vehicle operator, spectrally separating the collected light to form an absorbance and fluorescence emission pattern, and focusing the spectrally separated light on the sensing surface of the optical sensor, a memory for storing data sets respectively associated with an absorbance and fluorescence emission pattern formed from spectrally separated light reflected and emitted from an eye of an intoxicated person, wherein each of said stored data sets represents one of (i) a particular intoxicant and an associated concentration of that intoxicant in the body of the vehicle operator, or (ii) a particular combination of intoxicants and associated concentrations of that intoxicant in the body of the vehicle operator, and, a comparator for determining if the vehicle operator is too intoxicated to drive the vehicle from a signal output by the optical sensor and the stored data sets; and the operator drowsiness monitor comprises:

an operator drowsiness optical sensor having a sensing surface;

operator drowsiness monitoring optics capable of focusing an image of the vehicle operator's head and ayes on the sensing surface of the optical sensor, a memory for storing image data associated with physical characteristics of a vehicle operator's head and eyes which are one of (i) indicative of drowsiness, or (ii) indicative of alertness, an isolator capable of isolating from a signal output by the optical sensor that portion corresponding to said physical characteristics, and an indicator for indicating from the isolated portion of the signal and the stored image data which of the physical characteristics exhibited by the vehicle operator are indicative of drowsiness.

47. The monitoring system of claim 22, further comprising:

an alarm capable of being activated whenever the operator drowsiness monitor indicates the vehicle operator is drowsy.

48. The method of claim 26, further comprising the step of:

preventing the operator from operating the vehicle whenever the vehicle operator is not authorized to operate the vehicle.

49. A method of monitoring an operator of a vehicle comprising the steps of:

monitoring operator identity to determine if a vehicle operator is authorized to operate the vehicle;

monitoring operator drowsiness wherein said operator drowsiness monitoring is performed while the vehicle operator is operating the vehicle; and monitoring operator intoxication by monitoring reflected and emitted light patterns from an eye of the vehicle operator and comparing the monitored light patterns to reflected and emitted light patterns indicative of an intoxicated operator so as to determine if the operator is too intoxicated to operate the vehicle.

50. The monitoring system of claim 46, wherein only one of the operator identity monitoring optics, operator intoxication monitoring optics, and operator drowsiness monitoring optics is in registration with the optical sensor at a time, the system further comprising:

means for moving the identity monitoring optics, operator intoxication monitoring optics, and operator drowsiness monitoring optics into registration with the optical sensor during operation of the means for monitoring operator identity, means for monitoring operator intoxication, and means for monitoring operator drowsiness, respectively.

* * * * *